(12) United States Patent
Weber (10) Patent No.: US 11,865,998 B2
(45) Date of Patent: Jan. 9, 2024

(54) GAS GENERATOR, ESPECIALLY FOR A VEHICLE SAFETY SYSTEM

(71) Applicant: ZF Airbag Germany GmbH, Aschau a. Inn (DE)

(72) Inventor: Bernd Weber, Erharting (DE)

(73) Assignee: ZF AIRBAG GERMANY GMBH, Aschau Am Inn (DE)

( * ) Notice: Subject to any disclaimer, the term of this patent is extended or adjusted under 35 U.S.C. 154(b) by 150 days.

(21) Appl. No.: 17/114,606

(22) Filed: Dec. 8, 2020

(65) Prior Publication Data

US 2021/0179010 A1 Jun. 17, 2021

(30) Foreign Application Priority Data

Dec. 13, 2019 (DE) .................... 10 2019 134 264.3

(51) Int. Cl.
| | |
|---|---|
| *B60R 21/264* | (2006.01) |
| *B60R 21/261* | (2011.01) |
| *B60R 21/20* | (2011.01) |
| *B60R 21/26* | (2011.01) |

(52) U.S. Cl.
CPC ............ *B60R 21/264* (2013.01); *B60R 21/20* (2013.01); *B60R 21/261* (2013.01); *B60R 2021/2612* (2013.01); *B60R 2021/26029* (2013.01)

(58) Field of Classification Search
CPC ..... B60R 21/217; B60R 21/26; B60R 21/261; B60R 21/264; B60R 2021/26011; B60R 2021/26076; B60R 2021/2612; B60R 2021/2642; B60R 2021/2648
USPC ........................................ 280/736, 741, 742
See application file for complete search history.

(56) References Cited

U.S. PATENT DOCUMENTS

| | | | | |
|---|---|---|---|---|
| 4,530,516 A | * | 7/1985 | Adams ................ | B60R 21/2644 280/741 |
| 4,578,247 A | * | 3/1986 | Bolieau ...................... | B01J 7/00 422/165 |
| 5,516,147 A | * | 5/1996 | Clark .................... | B60R 21/272 280/736 |
| 5,584,505 A | * | 12/1996 | O'Loughlin .......... | B60R 21/272 280/741 |
| 5,584,506 A | * | 12/1996 | Van Wynsberghe ........................ | B60R 21/261 280/736 |

(Continued)

FOREIGN PATENT DOCUMENTS

| | | |
|---|---|---|
| CN | 201058593 | 5/2008 |
| CN | 201385637 | 1/2010 |

(Continued)

*Primary Examiner* — Barry Gooden, Jr.
(74) *Attorney, Agent, or Firm* — TAROLLI, SUNDHEIM, COVELL & TUMMINO L.L.P.

(57) ABSTRACT

The invention relates to a gas generator (10), especially for a vehicle safety system, comprising a sleeve (60) positioned inside the gas generator (10) which sleeve has first flow orifices (68) and encloses an ignition chamber (52) including first propellant (50), wherein a combustion chamber (56) filled with a second propellant (54) is connected to the outside of the sleeve (60), the combustion chamber being surrounded by a diffuser (70) located inside the gas generator (10) and having second flow orifices (78), and comprising a baffle plate (12) which has third flow orifices (14) and surrounds the diffuser (70), wherein the sleeve (60), the diffuser (70) and the baffle plate (12) are adhesively bonded to each other.

18 Claims, 2 Drawing Sheets

(56) References Cited

U.S. PATENT DOCUMENTS

| | | | |
|---|---|---|---|
| 5,851,027 A * | 12/1998 | DiGiacomo | B60R 21/272 |
| | | | 280/736 |
| 5,851,028 A | 12/1998 | Thibodeau | |
| 6,224,098 B1 | 5/2001 | Katsuda et al. | |
| 6,406,053 B1 * | 6/2002 | Bayer | B60R 21/2644 |
| | | | 280/736 |
| 6,447,007 B1 | 9/2002 | Digiacomo et al. | |
| 2011/0221175 A1 | 9/2011 | Kobayashi et al. | |
| 2011/0253000 A1 * | 10/2011 | Kobayashi | B60R 21/2644 |
| | | | 102/531 |
| 2013/0283760 A1 * | 10/2013 | Kobayashi | F02G 3/00 |
| | | | 60/39.12 |
| 2020/0180548 A1 * | 6/2020 | Ueda | B01J 7/00 |
| 2020/0386525 A1 * | 12/2020 | Noda | F42B 3/107 |

FOREIGN PATENT DOCUMENTS

| | | | | |
|---|---|---|---|---|
| CN | 205615470 | | 10/2016 | |
| DE | 102007048735 A1 * | | 4/2009 | B60R 21/2644 |
| EP | 3835141 A1 * | | 6/2021 | B60R 21/20 |
| JP | 958398 | | 3/1997 | |
| JP | 10291418 | | 11/1998 | |
| JP | 201261960 | | 3/2012 | |
| WO | 2009043904 | | 4/2009 | |

* cited by examiner

GAS GENERATOR, ESPECIALLY FOR A VEHICLE SAFETY SYSTEM

RELATED APPLICATION

This application claims priority from German Application No. 10 2019 134 264.3, filed Dec. 13, 2019, the subject matter of which is incorporated herein by reference in its entirety.

The invention relates to a gas generator, especially for a vehicle safety system, as set forth in claim 1. Further, the invention deals with an airbag module comprising such gas generator and with a vehicle safety system comprising such gas generator.

Gas generators supply e.g. gas for filling an airbag or for driving a belt tensioner or a hood stay.

It is a drawback in known gas generators that frequently they have single components of complex design which are interconnected by a plurality of elaborate and expensive connecting technologies.

Against this background, it is an object of the present invention to eliminate or mitigate at least one of said aforementioned drawbacks. In particular, the invention is intended to state a gas generator that includes components of simple design which are interconnected by little-elaborate connecting technologies.

It is another object of the invention, to state an enhanced airbag module, a vehicle safety system and a method for operating a gas generator.

In accordance with the invention, this object is achieved, with respect to the gas generator, by the subject matter of claim 1, with respect to the airbag module, by the subject matter of claim 14 and, with respect to the vehicle safety system, by the subject matter of claim 15.

The gas generator according to the invention includes a sleeve positioned inside the gas generator which has first flow orifices and an ignition chamber including a first propellant, wherein a combustion chamber filled with a second propellant which is surrounded by a diffusor located inside the gas generator and having second flow orifices is connected to the outside of the sleeve. In addition, the gas generator according to the invention includes a baffle plate having third flow orifices and surrounding the diffusor, with the sleeve, the diffusor and the baffle plate being adhesively bonded to each other.

In the gas generator according to the invention, three components, i.e. the sleeve, the diffusor and the baffle plate, on the one hand are simply designed and each includes predefined openings in the form of material-penetrating orifices or breakthroughs, and, on the other hand, the three components are tightly interconnected by adhesive bonding, thus preventing all of the three components from being mutually unintentionally displaced or from being inadvertently changed in position relative to each other. This applies both to an idle state of the gas generator in which no activation as intended has been implemented yet and to an activating state in which the gas generator has been or is activated as intended. In addition, said adhesive bonding between the simply designed single components of sleeve, diffusor and baffle plate enables said three single components to act quasi like one single subassembly of substantially more complex design which is understood to be so-to-speak the sum of the three single components. In detail, this means that, on the one hand, already when mounting the gas generator this fact can offer an advantage by appropriately handling or treating such subassembly consisting of a sleeve, a diffusor and a baffle plate. On the other hand, this can be advantageous when or after activating the gas generator, as the adhesively bonded single components of a sleeve, a diffusor and a baffle plate can behave or act at least in portions like a subassembly formed of the same, wherein especially portions of the diffusor and the baffle plate together with the sleeve can be displaced, while acting as structural unit, in one direction, preferably displacing direction, as will be detailed further below.

Especially, the sleeve, the diffusor and the baffle plate can be connected by one single welded joint or by plural welded joints, especially a first welded joint and a second welded joint, wherein the welded joints may preferably be configured as radially peripheral welded joints. With respect to the manufacture of the gas generator, it may be of major advantage when the components of sleeve, diffusor and baffle plate are connected by one single welded joint, as before producing the welded joint said three components need to be positioned relative to each other merely once and, in addition, said connection can be made by one single welding operation. This is time-saving and cost-saving and, moreover, imparts a high degree of precision to such design, as components and/or component groups need not be positioned relative to each other several times in succession in an elaborate manner before a welding operation. In addition, when producing such single welded joint, merely one single quality control, especially monitoring of a weld pool for the welded joint, is required. Even if a first welded joint and a second welded joint are provided instead, the already aforementioned advantages concerning an adhesive bonding of the sleeve, the diffusor and the baffle plate are still maintained.

Preferably, in the gas generator the sleeve may be in the form of a substantially hollow-cylindrical component having a front-side first opening and an axially opposed second opening, the first opening being closed by the diffusor and a tamping being optionally positioned between the diffusor and the sleeve. As the sleeve has two opposed openings, i.e. has no closure or bottom at any front side, it can be manufactured at extremely low costs. A closure at a front side can be implemented at low cost by the diffusor or a bottom portion thereof. Accordingly, it may be necessary or beneficial in terms of construction that a tamping, e.g. in the form of a thin metal foil, is positioned or inserted between the sleeve and the diffusor. In such design, especially the tamping can equally be fastened by welding even with the one single welded joint that interconnects the sleeve, the diffusor and the baffle plate, and thus can also be adhesively bonded or connected to the sleeve and the diffusor.

In particular, the sleeve may be closed at its second opening by a holder which preferably receives an igniter and may be slidably supported on the same in a displacing direction. The sleeve may be attached or press-fitted onto the holder so that it is slidably adjacent along a certain longitudinal extension of the holder in the displacing direction, especially away from the holder. Here the holder can constitute a type of guideway, when the sleeve is displaced. In the case of activation and, resp., operation of the gas generator, pressure which causes the sleeve to be displaced may build up inside the ignition chamber.

In particular, a plane radially extending through the first flow orifices, especially the centers thereof, can equally extend through the third flow orifices, especially the centers thereof, and the second flow orifices can be arranged to be spaced apart from the plane. The plane is an imaginary plane that extends especially perpendicularly to a longitudinal axis of the gas generator through the first and third flow orifices and, thus, defines the axial length and, resp., position thereof within the gas generator and relative to each other. Accordingly, the first flow orifices of the sleeve can constitute the first openings for a path of the gas stream which can be generated inside the ignition chamber, wherein the third flow orifices of the baffle plate may be the last orifices for said gas stream along this path inside the gas generator, before the gas stream can leave the gas generator to the outside into environment of the gas generator. Thus, the first and the last orifices for a gas stream on its way through the gas generator may be located at an equal axial position, as indicated by the plane.

Preferably, upon activation of the gas generator, the sleeve having the first flow orifices can be displaced in a/the displacing direction, especially along a longitudinal axis of the gas generator, especially such that the plane is positioned outside the third flow orifices, especially between the third and second flow orifices. Upon activation of the gas generator, by burning off the first propellant by means of an igniter inside the ignition chamber pressure can be built up which will increase to such extent that, despite the possibility of reducing pressure through the first flow orifices, it can move and, resp., lift or displace the sleeve especially in a direction away from the igniter. By displacing the sleeve, correspondingly also the first flow orifices in the sleeve are displaced so that the (imaginary) plane is correspondingly displaced as well. The distance of such displacement may be so long that the plane will no longer extend through the third flow orifices.

Especially, the sleeve includes a substantially radially extending first sleeve portion that is adhesively bonded to the inside of a bottom of the diffusor and that is transformed into a conical second sleeve portion tapering toward the sleeve center axis to which second sleeve portion a third sleeve portion extending substantially in parallel to the sleeve center axis and especially including the first flow orifices is connected. In this way, the sleeve is designed as a trumpet-type cavity that is easy to manufacture. The third sleeve portion can help attach or push the sleeve onto a/the igniter or onto a/the holder of the igniter so that it can be easily closed by the latter at its second opening. The arrangement of the first flow orifices in the third sleeve portion is advantageous with respect to a gas discharge and, resp., a flow path of a gas, as will be described in more detail further below. However, it is also imaginable for the first flow orifices to be arranged only or additionally in the conical second sleeve portion.

The baffle plate may be closed by a closure bottom and with the latter may form an area of the outer housing of the gas generator, and the closure bottom may enclose, together with the diffusor and the sleeve, the combustion chamber especially such that the combustion chamber is in the form of a toroidal chamber which, when viewed in the longitudinal section, preferably includes sidewalls substantially aligned in parallel to each other and facing the closure bottom which are transformed into sidewalls converging obliquely relative to each other in a direction facing away from the closure bottom. If the sidewalls of the combustion chamber converge obliquely relative to each other in an area facing away from the closure bottom, the special spatial configuration of the combustion chamber causes the combustion chamber to narrow in this area. If, in this area of the narrowing, discharge orifices of the combustion chamber, and concretely speaking the second flow orifices in the diffusor, are provided, then the flow rate for gas generated in and exiting the combustion chamber can be advantageously optimized, especially increased in this case. In other words, the combustion chamber extends, when viewed in the longitudinal section of the gas generator, in the form of a nozzle so that a discharge rate for gas exiting the combustion chamber can be advantageously increased.

In particular, the baffle plate may be connected to the closure bottom and the diffusor by means of one single, especially radially circumferential, weld, and/or the combustion chamber may include an axis of symmetry which extends through the second flow orifices, especially the centers thereof, substantially in parallel to the longitudinal axis of the gas generator. Here, too, it is of advantage, when manufacturing the gas generator, to adhesively bond three components to each other in a cost-saving and time-saving manner, as with such single welded joint merely one single working step and/or one single quality control, especially monitoring a weld pool for the welded joint, is required. In addition, when the combustion chamber has such a symmetric design that an axis of symmetry extends through the second flow orifices through which gas generated in the combustion chamber can or shall flow out, then the gas can advantageously flow extremely uniformly out of said combustion chamber through the second flow orifices.

The baffle plate may be pot-shaped and may have a cylindrical first wall portion to which a conical radially inwardly narrowing second wall portion is connected, the latter being transformed into a bottom portion substantially perpendicularly to the longitudinal axis of the gas generator, wherein the baffle plate preferably includes a recess in the bottom portion and/or the third flow orifices as slot-shaped substantially rectangular openings. As compared to the cylindrical first wall portion, the conical radially inwardly narrowing second wall portion helps provide, outside said wall portion, more space for adjacent components. This is especially the case when the baffle plate here forms an area of the outer housing. Concretely speaking, the gas generator can be mounted in a more space-saving manner into a module surrounding the latter and including an airbag to be inflated by the gas generator. In other words, the gas generator claims less space in the conical area as compared to adjacent components toward the outside than this is the case in the cylindrical area of the first wall portion of the baffle plate. The recess in the bottom portion of the baffle plate can be advantageously utilized for positioning and/or centering the gas generator by the recess engaging, with complementary action, in a projection of a neighboring component such as e.g. the afore-mentioned module. In addition, or as an alternative, the recess may serve as a constructional measure for increasing the wall stiffness of the baffle plate, which is of advantage in an event of elastic and/or plastic deformation of the baffle plate in this area by increasing internal pressure inside the gas generator after activation of the gas generator. By the baffle plate being also adhesively bonded to the diffusor, this advantage may quasi be transferred to the diffusor, too. What is meant by this is the fact that the increase in the wall stiffness of the baffle plate thus has a correspondingly positive effect, quasi like an increase in the wall stiffness, on the diffusor, as the diffusor and the baffle plate are appropriately adhesively bonded to each other in a load-transmitting manner. By configuring the third flow orifices as slot-shaped substantially rectangular orifices, after activation of the gas generator, gas generated inside the gas generator which is to be discharged to the environment of the gas generator can be guided through correspondingly configured third flow orifices in an extremely advantageous manner.

The diffusor may be pot-shaped and may include a cylindrical first portion to which a conical radially inwardly narrowing second portion is connected which is transformed into a/the bottom of the diffusor substantially perpendicularly to the longitudinal axis of the gas generator and includes the second flow orifices. This configuration especially helps obtain the afore-mentioned advantageous shape of the combustion chamber.

In particular, the baffle plate and the diffusor can enclose a pot-shaped gas guiding chamber and/or extend substantially in parallel to each other over the entire area of the/a gas guiding chamber, with the exception of the/a recess of the baffle plate. Such a design or such designs can help achieve hot gas introduced from the combustion chamber into the gas guiding chamber to be guided as uniformly as possible and along a relatively long distance in the gas guiding chamber, which distance offers sufficient possibilities of efficiently filtering and/or cooling the gas, before the gas can be discharged through the third flow orifices of the baffle plate to the environment of the gas generator. Hence, due to the fact that the gas guiding chamber is pot-shaped, not only lateral areas of the gas guiding chamber but also quasi "ceiling areas" of the gas guiding chamber are available to this end. In other words, such gas guiding chamber extends in axial and radial directions.

Preferably, in the case of activation of the gas generator, gas formed in the ignition chamber can flow into the combustion chamber only in the radial direction through the first flow orifices of the sleeve, and gas formed in the combustion chamber can flow into the/a gas guiding chamber only in the axial direction through the second flow orifices of the diffusor, wherein especially areas of the diffusor and of the baffle plate can be displaced together with the sleeve as a structural unit in the displacing direction. By such given direction of the gas, said gas can be guided with a deflection of direction and over a relatively long distance inside the gas generator, with options for efficient filtering and/or cooling of the gas being advantageously given here, for example by efficient desired slag deposition from the gas which may entrain slag/particles.

Due to the fact that areas of the diffusor and the baffle plate can be displaced together with the sleeve as a structural unit in the displacing direction, said areas of the diffusor and the baffle plate interact with the sleeve quasi like one single or common pot-shaped container that is closed by the closure bottom, wherein, after activation of the gas generator, internal pressure forming thereafter can raise the structural unit for pressure compensation or deform the same in the displacing direction. In other words, after activation of the gas generator, by burning off the propellants such high internal pressure can be generated within the gas generator that areas of the outer housing thereof can bulge and can deform elastically and/or plastically to a certain small extent, which may be desired as intended. Such deformation may advantageously be carried out or implemented in a material-saving manner by the afore-described displacement of the structural unit comprising the diffusor, the baffle plate and the sleeve, as no single individual components are excessively point-loaded, but the structural unit per se can be loaded in a mechanically optimized way.

A coordinate aspect of the invention relates to an airbag module comprising a gas generator, an airbag inflatable by the gas generator and a fastener for mounting the airbag module on a vehicle, the gas generator being preferably configured according to the afore-described manner.

Furthermore, within the scope of the present application, there is disclosed and claimed a vehicle safety system, especially for the protection of a person, such as, for example, a vehicle occupant or a pedestrian, comprising a gas generator, an airbag inflatable by the latter as part of an airbag module, and an electronic control unit by means of which the gas generator can be activated if a release situation is given. In the vehicle safety system according to the invention, preferably the gas generator is configured according to the afore-described manner.

Hereinafter, the invention shall be illustrated in detail by way of example embodiments with reference to the attached schematic figures, wherein.

In the following, like reference numerals will be used for like and equally acting parts.

Figure 1:
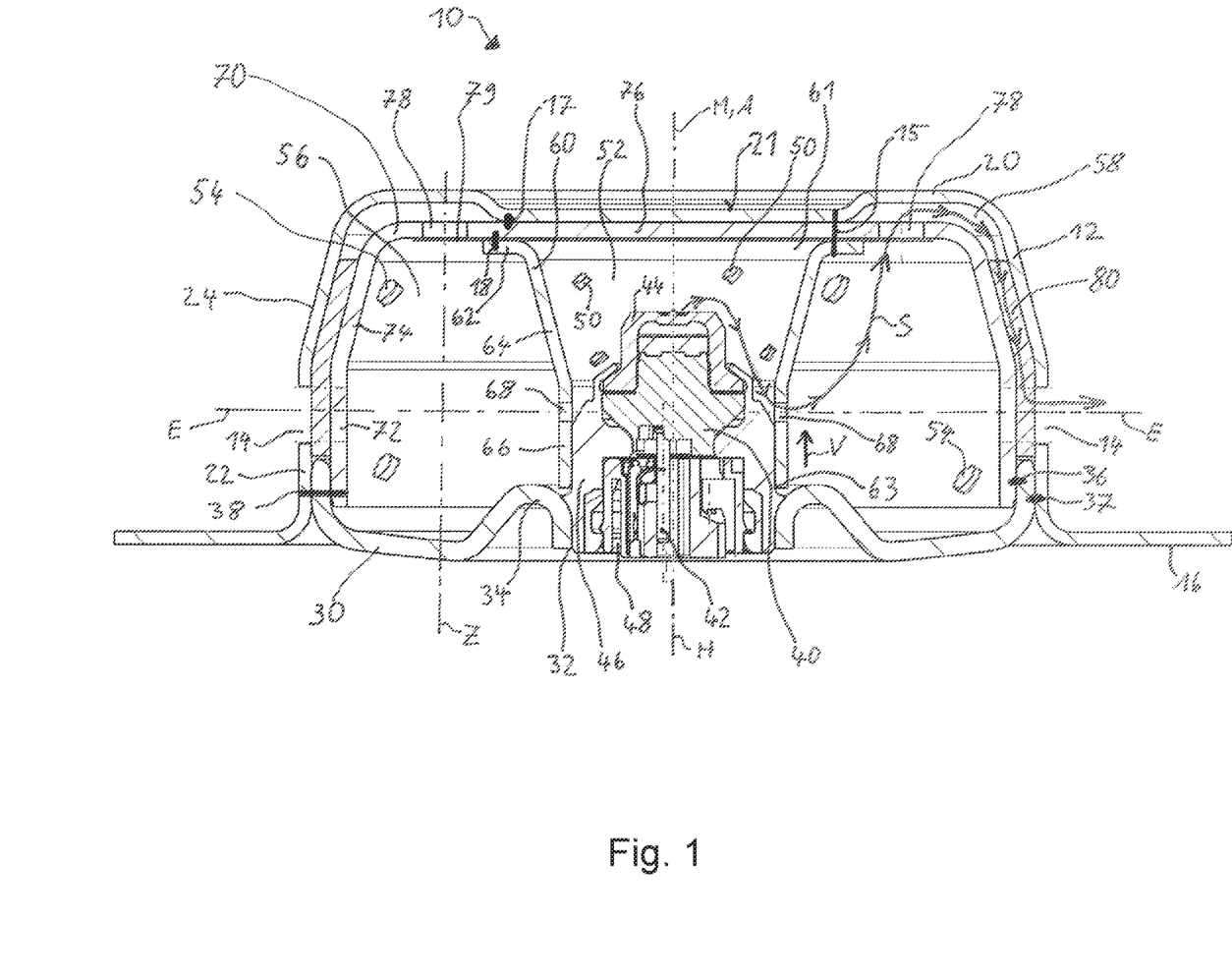
FIG. 1 shows a longitudinal section view across a gas generator according to the invention.

FIG. 1 illustrates a longitudinal section across a gas generator 10 according to the invention having a longitudinal axis A along which the gas generator axially extends and a center axis M, the axes A being shown in FIG. 1 such that they are positioned to be congruent with the center axis M. The gas generator 10 includes a pot-shaped baffle plate 12 having a bottom portion 20 and third flow orifices 14 which are arranged in the baffle plate 12 as material-penetrating openings or breakthroughs. A closure bottom 30 closes the baffle plate 12 on the open side of the baffle plate 12 facing the bottom portion 20. The baffle plate 12 and the closure bottom 30 together form part of an outer housing of the gas generator 10. The baffle plate 12 includes, especially centrally in the area of its bottom 20, a recess 21 which is to be understood as an indentation of the bottom 20 in the direction of the interior of the baffle plate 12. The closure bottom 30 includes an especially central opening 32 which is closed by a holder 46 and an igniter 40 received by the holder 46. Inside the gas generator 10, a sleeve 60 is fastened to the holder 46, wherein especially the holder 46 has a substantially cylindrical portion to which the sleeve 60 is attached with a substantially hollow-cylindrical third sleeve portion 66 shaped to be correspondingly complementary to the portion, in such a way that the sleeve 60 is slidably supported along a longitudinal extension of the holder 46 or along the cylindrical portion of the holder 46 in a displacing direction V away from the closure bottom 30. A second sleeve portion 64 which extends, with an increasing distance from the third sleeve portion 66, conically outwardly, viz. away from a central sleeve center axis H, is connected to the substantially parallel sidewall of the third sleeve portion 66. The second sleeve portion 64 is finally transformed, in an end area of the sleeve 60, into a first sleeve portion 62 extending radially outwardly and substantially perpendicularly to the sleeve center axis H, said sleeve portion 62 inwardly enclosing a first opening 61 of the sleeve 60. The sleeve 60 is in the form of a cavity open to both front sides which, on one front side, includes the first opening 61 and, on the front side opposed thereto, includes a second opening 63 which is enclosed by a corresponding end area of the third sleeve portion 66. Accordingly, the sleeve 60 can also be understood to be a trumpet-type cavity.

The sleeve 60 is fastened, with its first sleeve portion 62, to a diffusor 70 located inside the gas generator 10 and including second flow orifices 78, especially to a bottom 76 of the diffusor 70 there. A tamping 79, especially in the form of a thin metal foil made from e.g. steel, copper or aluminum, closes the second flow orifices 78 of the diffusor 70 in an idle state of the gas generator 10 in which the gas generator is not or has not yet been activated as intended.

Accordingly, the tamping 79 between the sleeve 60 and the diffusor 70 may be arranged as a full-surface disk-shaped component, as shown in FIG. 1. As an alternative to this, it is also possible, however, for the tamping 79 to be configured as a ring-shaped element (not shown) and to close the second flow orifices 78 of the diffusor 70 such that the tamping 79 is not positioned between the sleeve 60 and the diffusor 70 or, resp., need no longer be positioned there. In other words, with this alternative, the tamping 79 would be arranged over the flow orifices 78 to ensure merely minimum covering, but it would not extend further radially inwardly between the sleeve 60 and the diffusor 70.

The sleeve 60 encloses an ignition chamber 52 that is filled with a first propellant 50. The ignition chamber 52 is delimited by the sleeve 60, the holder 46 including the igniter 40 and the diffusor 70 and, resp., the tamping 79 applied, especially bonded or welded, to the diffusor 70. The ignition chamber 52 may be understood to be a space formed corresponding to the trumpet shape of the sleeve 60 and may be described as a substantially frustoconical space including a sidewall which converges tapering in the direction of the igniter 40 toward the sleeve center axis H.

Outside the sleeve 60 and directly adjacent thereto, there is formed a combustion chamber 56 in which a second propellant 54 is disposed. Each of the two propellants, the first and second propellants (50, 54), may comprise, as a fill of individual propellant bodies, e.g. compressed, especially dry-compressed propellant pellets or extruded bodies, but may also be present in the form of broken granules or in the form of a monolithic molded body or in the form of stringed disks or rings. The first and second propellants (50, 54) may be similar with respect to their chemical composition and/or their shape, or else may be different in this respect. The combustion chamber 56 is delimited by the sleeve 60, the diffusor 70 with the tamping 79 fastened there and the closure bottom 30, and may be understood to be a toroidal chamber which, when viewed in the longitudinal section (FIG. 1), preferably has sidewalls substantially aligned in parallel to each other facing the closure bottom 30 which are transformed into sidewalls converging obliquely relative to each other in the direction away from the closure bottom (30). Thus, the combustion chamber 56 surrounds the ignition chamber 52 in a radially circumferential manner.

Between the diffusor 70 and the baffle plate 12, a ring-shaped filter 80 is positioned and is especially clamped, press-fitted and/or non-positively or positively connected between said two components. The filter 80 takes a shape which is complementary to its contact faces with said two components. In particular, the filter 80 is understood to be a cavity having a cylindrical portion which is especially in the form of a straight circular cylinder, with a frustoconical portion being connected thereto, and having a sidewall which is tapered radially inwardly. The filter 80 may be made from metal, especially in the form of a knitted mesh, a coil or single-layer or multi-layer sheet members, and has the function to cool gas flowing out of the gas generator 10 and/or to filter said gas for particles. When manufacturing the gas generator, for example, the filter 80 may initially be attached or press-fitted onto the diffusor 70, and then the baffle plate 12 may be attached or press-fitted onto the filter 80 or fastened by a press-fit connection thereto, from outside while surrounding the filter 80.

The sleeve 60 includes first flow orifices 68 which are formed especially in the third sleeve portion 66 as individual material-penetrating openings or breakthroughs, preferably in the form of circular holes. The number of the first flow orifices 68 is four, but it may as well be less or more, with the first flow orifices 68 being preferred to be arranged at equal axial height radially circumferentially on the sleeve 60. The first flow orifices 68, or at least some of them, might also be arranged in the second sleeve portion 64 of the sleeve 60. The first flow orifices 68 constitute a connection for a gas between the ignition chamber 52 and the combustion chamber 56, and preferably are unclosed already in an idle state of the gas generator 10. However, it is also imaginable for the first flow orifices 68 to be closed by a metal foil (not shown) and, in the case of operation, after activation of the gas generator 10, are opened by an internal pressure increasing in the ignition chamber 52 by the metal foil tearing or being locally destroyed.

Hereinafter, a flow path S of a gas inside the gas generator after activation thereof as intended is described. To simplify matters, in the following merely a gas or a flow of gas or a gas flow is mentioned, wherein always gas formed inside the gas generator and a possible admixture of particles in said gas is meant, as by burn-off or disintegration of a propellant also additional, usually hot particles which may be admixed to said gas are generated apart from hot gas.

Upon activation of the gas generator 10, the igniter 40 including one or more, especially two, contact elements 42 is triggered and, resp., activated by means of a current pulse. Accordingly, a plug connected to a control device (both of which are not shown) is plugged to the gas generator 10, especially into a plug interface 48, and transmits the current pulse from the control device to or into the igniter 40 which in its interior has an element forming pressure and/or particles, such as pyrotechnics, which is surrounded by a cap 44 of the igniter 40. After triggering the igniter 40, such high pressure is built up inside the igniter 40 that the cap 44 opens or breaks, with gas being released into the ignition chamber 52 to ignite the first propellant 50. In FIG. 1, a possible path of a flow of the gas is illustrated by an elongate appropriately shaped line that is interspersed with directional arrows for such flow path S. By the ignition of the first propellant 50 also gas is generated that can enter or flow through the first flow orifices 68 from the ignition chamber 52 into the combustion chamber 56.

The gas that has flown into the combustion chamber 56 then can ignite the second propellant 54 present there, the latter equally generating, by its burn-off, further gas which breaks the tamping 79 by increasing pressure and enables the gas to flow out of the combustion chamber 56 through the second flow orifices 78 of the diffusor 70.

The gas exiting the combustion chamber 56 then flows into a gas guiding chamber 58 which is enclosed by the baffle plate 12 as an outer delimitation and the diffusor 70 as an inner delimitation. In the area of its recess 21, the baffle plate 12 is connected to and contacts the diffusor 70 so that no gas guiding chamber can form in this area. Accordingly, the gas guiding chamber 58 can be understood to be a pot-shaped chamber, in the aforementioned area of the recess 21 a bottom area of said chamber being quasi spared. In particular, over the entire area of the gas guiding chamber 58, the baffle plate 12 and the diffusor 70 extend substantially in parallel to each other, wherein the recess 21 is to be excluded therefrom and, resp., is not to be considered.

After flowing into the gas guiding chamber 58, the gas is guided along the contour of the baffle plate 12 and the diffusor 70 through the filter 80 up to the third flow orifices 14 of the baffle plate 12 through which it then passes and flows into an outer area or into the environment of the gas generator 10.

On the whole, the afore-mentioned generation and guidance of the gas by way of the arrow symbol for the flow path S can also be described as follows with respect to the direction, especially with respect to one, advantageously several changes of direction of the flow path S.

After activating the gas generator 10, initially by breaking the cap 44 of the igniter 40, a first quantity of gas is released into the ignition chamber 52, substantially in the direction of the bottom 76 of the diffusor 70 facing the breaking cap 44. Then, after a relatively short distance, a reversal of the flow path S substantially by 180° in the direction of the first flow orifices 68 of the sleeve 60 will follow. This flow path is due to the fact that the first flow orifices 68 are the only orifices through which the gas can flow out of the ignition chamber 52. Here, a particular advantage of the specific cone-shaped ignition chamber 52 and, resp., of the correspondingly conical area of the sleeve 60 takes effect, for, as the second sleeve portion 64 is appropriately tapered toward the sleeve center axis H, gas generated in the ignition chamber 52, especially ignition gas for igniting the second propellant 54, can be guided extremely quickly toward or through the first flow orifices 68. The afore-mentioned conical shape results, toward the first flow orifices 68 and in the environment thereof inside the ignition chamber 52, in a nozzle-type narrowing or a nozzle-shaped annular passage toward the first flow orifices 68. In this way, the gas can be advantageously accelerated in the direction of first flow orifices 68 to pass through the first flow orifices 68 as quickly as possible so as to ignite the second propellant 54 in the combustion chamber 56 as effectively as possible and with correspondingly efficient impact.

The sleeve 60, the diffusor 70 and the baffle plate 12 are adhesively bonded to each other. It is possible for said three components to be interconnected by one single joint, especially one single welded joint 15. The welded joint 15 is provided as a radially circumferential weld or welding extending across the materials of all three components and may especially be a laser weld. When manufacturing the gas generator 10, the three components of sleeve 60, diffusor 70 and baffle plate 12 can be positioned properly relative to each other. After that, by means of suitable laser adjustment, especially focal adjustment of a welding laser, a laser beam can appropriately act upon the three components from the inside of the diffusor 70 or from the outside of the baffle plate 12 so that the three components are adhesively bonded to each other in one single melting area which is symbolically represented by the reference numeral 15 only on one side in the views of FIGS. 1 and 2.

Figure 2:
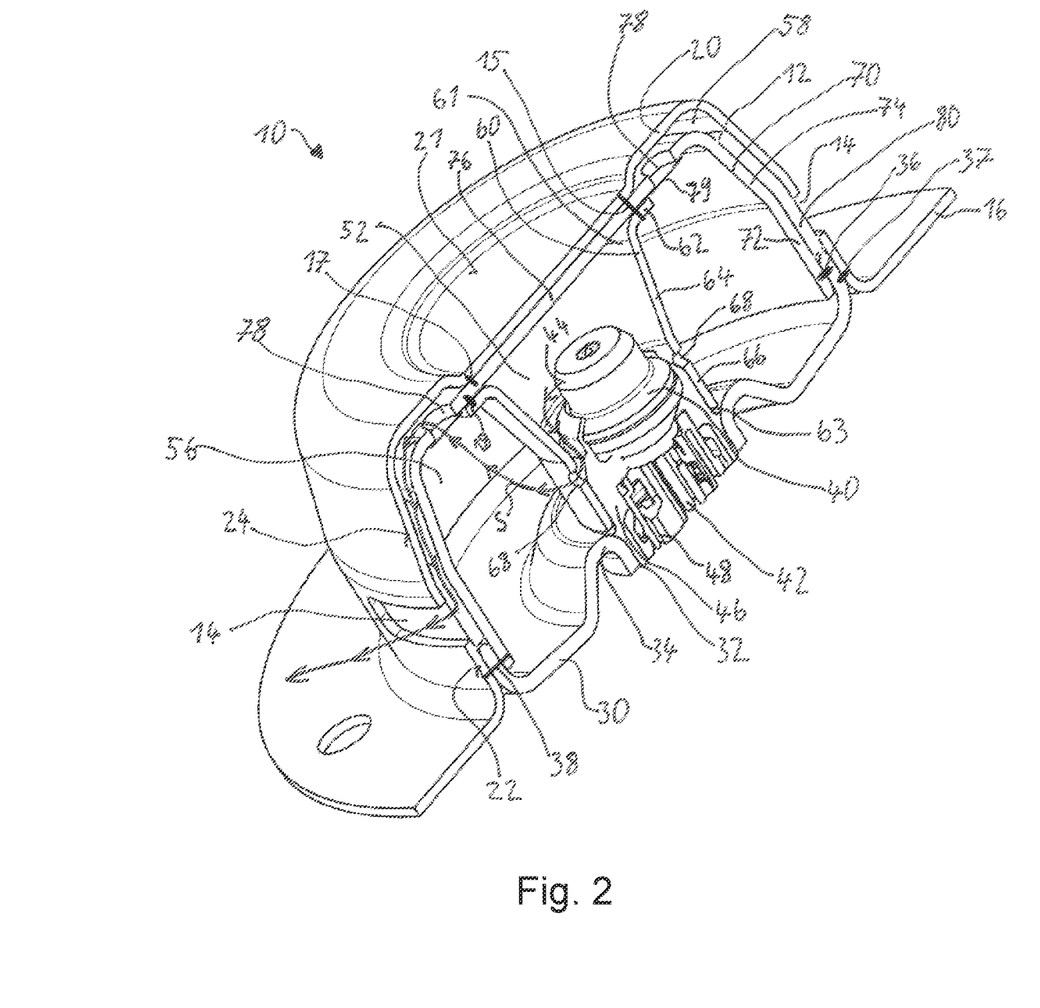
FIG. 2 shows a three-dimensional representation of the gas generator as shown in FIG. 1.

As an alternative, the sleeve 60, the diffusor 70 and the baffle plate 12 may also be adhesively bonded to each other by plural welded joints, especially a first welded joint 17 and a second welded joint 18. Accordingly, the baffle plate 12 may be bonded to the diffusor 70 by the first welded joint 17, and the diffusor 70 can be bonded to the sleeve 60 by means of the second welded joint 18. In this case, too, the first and second welded joints 17, 18 may be in the form of radially circumferential welded joints and in the Figures are shown only symbolically on one side by a corresponding material bond.

Thus, the sleeve 60, the diffusor 70 and the baffle plate 12 are connected tightly and non-slidably relative to each other, and thus can advantageously act quasi as an assembled complete component. In particular, during manufacture of the gas generator, said component group comprising the sleeve 60, the diffusor 70 and the baffle plate 12 can be treated as a pre-mounted subassembly.

Further, especially areas of the diffusor 70 and of the baffle plate 12 can be displaced along with the sleeve 60 as a structural unit in the displacing direction V. What is meant here is that, upon or after activation of the gas generator 10, an increasing pressure forming inside the ignition chamber 52 and/or inside the combustion chamber 56 can elastically and/or plastically deform areas of the diffusor 70 and of the baffle plate 12 to the outside. In other words, said areas are bulging and, resp., are deformed to the outside. Such deformation may be desired as intended. In addition, a displacement of the sleeve 60 in the displacing direction V may equally be desired so that, for example, the first flow orifices 66 of the sleeve 60 are equally displaced in the displacing direction V so as to be able to ignite the second propellant 54 more efficiently over a particular longer axial distance through the hot gas which flows through the first flow orifices 66 into the combustion chamber 56. In other words, a hot gas jet flowing through the first flow orifices 66 into the combustion chamber 56 will so-to-speak pass, over a certain axial distance, along the plurality of propellant bodies in the combustion chamber 56 and will ignite them more extensively and more effectively.

Both aforementioned desired effects and, resp., dynamic processes, viz. the bulging and, resp., deforming of the baffle plate 12 and the diffusor 70 and the displacement of the sleeve 60 in the displacing direction V, may advantageously be implemented precisely and without great effort by the fact that the three components of sleeve 60, diffusor 70 and baffle plate 12 are adhesively bonded to each other. The three components cannot be inadvertently displaced or deformed detrimentally relative to each other in the afore-mentioned dynamic processes. The baffle plate 12 and the diffusor 70 are especially deformed and moved to be outwardly bulging while acting together quasi like one single component, and the sleeve 60, while being quasi attached to said two components, is also displaced simultaneously with this movement, without an inadvertent displacement of the sleeve 60 such as e.g. a leakage in the form of a gap between the first sleeve portion 62 and the diffusor 70, being possible to occur.

FIG. 1 especially illustrates an idle position of the gas generator 10 at which the gas generator 10 has not yet been activated or triggered as intended. The afore-mentioned dynamic processes after activation of the gas generator 10, viz. the bulging or deforming of the baffle plate 12 and the diffusor 70 and the displacement of the sleeve 60 in the displacing direction V, are not shown separately per se. As is evident from FIG. 1, in the idle state of the gas generator 10, a plane E extends through the first flow orifices 68 of the sleeve 60, especially the centers thereof, in the radial direction, wherein the plane E equally extends through the third flow orifices 14 of the baffle plate 12, especially the centers thereof. The second flow orifices 78 of the diffusor 70 are arranged to be spaced apart from the plane E. The plane E is understood to be an imaginary afore-described plane. Upon activation of the gas generator 10, the sleeve 60 including the first flow orifices 68 can be displaced in the displacing direction V such that the plane E is positioned outside the third flow orifices 14 between the third and second flow orifices 14, 78. In this way, the plane E is displaced quasi upwards (reference to FIG. 1) in the direction of the second flow orifices 78.

The baffle plate 12 may be connected to the closure bottom 30 and the diffusor 70 by means of one single radially circumferential weld 38, as is symbolically indicated in each of the Figures on one side only (on the left in the Figures). Herefrom similar advantages are resulting, as this has been described already further above concerning the single welded joint 15. In addition, with the one single weld 38 the further advantage is resulting that also two components comprising the major part of the outer housing of the gas generator 10, viz. the baffle plate 12 and the closure bottom 30, can be connected as shell-type components quasi enclosing the gas generator 10 in a pressure-resistant manner. In other words, the single weld 38 allows to manufacture not only a major part of the outer housing but, at the same time, also to adhesively fasten a third component which is pressure-loaded upon activation of the gas generator 10, i.e. the diffusor 70.

As an alternative, the three components of baffle plate 12, closure bottom 30 and diffusor 70 may also be adhesively bonded to each other by implementing two separate welds, i.e. a first welded joint 36 between the diffusor 70 and the closure bottom 30 and a second welded joint 37 between the closure bottom 30 and the baffle plate 12. Accordingly, both welded joints 36 and 37 can be configured as radially circumferential welds.

As shown in FIG. 1, the combustion chamber 56 includes an axis of symmetry Z which extends through the second flow orifices 78, especially the centers thereof, substantially in parallel to the longitudinal axis A of the gas generator 10. As the combustion chamber 56 has such symmetric design, as is visible from FIG. 1, the gas can be advantageously generated, in the case of activation, extremely uniformly in the combustion chamber 56 by burning off the second propellant 56, and then can be guided also homogenously and uniformly inside the combustion chamber 56 and, in such way, can also flow out of the combustion chamber 56 through the second flow orifices 78.

The baffle plate 12 is pot-shaped and includes a cylindrical first wall portion 22 to which a conical radially inwardly narrowing second wall portion 24 is connected which is transformed into the bottom portion 20 substantially perpendicularly to the longitudinal axis A of the gas generator 10. Over most of its shape, as compared to the afore-described shape or configuration of the baffle plate 12, the diffusor 70 has a relatively similar outline or a similarly complementary contour, as is clearly visible from FIG. 1.

The diffusor, too, is pot-shaped and has a cylindrical first portion 72 to which a conical radially inwardly narrowing second portion 74 is connected which is transformed into the bottom 76 of the diffusor 70 substantially perpendicularly to the longitudinal axis A of the gas generator 10. Thus, the baffle plate 12 and the diffusor 70, and, resp., the contours thereof, extend along a relatively large distance, viz. substantially along the extension of the gas guiding chamber 58 formed by said two components, substantially in parallel to each other. Consequently, the gas guiding chamber 58 has a very homogenous design and, resp., gas can be guided through the gas guiding chamber 58 in an advantageously homogenous manner.

The closure bottom 30 has an arch 34 which, upon activation of the gas generator 10, may serve as a type of resilient member. As also in this case the closure bottom 30 can be deformed elastically and/or plastically somewhat outwardly by increasing internal pressure inside the gas generator 10, the arch 34 serves as a type of dynamically loadable compensation member which is adapted to absorb or cushion at least a certain proportion of deformation. In so doing, the arch 34 may bend in the direction of the outer area of the gas generator 10 (not shown) and may absorb and, resp., compensate a proportion of respective deformation forces.

The baffle plate 12 includes an outwardly radially projecting edge or collar which is in the form of a flange 16 and may serve for mounting the gas generator 10 to further components (not shown), such as e.g. components of an airbag module or a vehicle. For this purpose, the flange 16 may include openings or breakthroughs (not shown).

Especially the third flow orifices 14 of the baffle plate 12 are slot-shaped substantially rectangular orifices. Concretely speaking, six of said orifices extend to be radially circumferential, preferably equally spaced from one another, about the periphery of the baffle plate 12. Orifices of this type enable gas to flow out of the gas generator 10 to the environment thereof in an extensive and smoother way than this would be the case with plural smaller orifices. Thus, especially the large-area third flow orifices 14 and, resp., the material of the baffle plate 12 surrounding said orifices are not loaded in an excessively eroding manner by a quickly discharging gas.

FIG. 2 illustrates the same embodiment of the gas generator 10 as it is shown in FIG. 1, in a perspective view. Here the same reference numerals as in FIG. 1 are used for like and equally acting parts. Especially, in FIG. 2 furthermore an opening or a bore in the flange 16 of the baffle plate 12 is shown which may be used to fasten the gas generator 10 to an airbag module (not shown). In addition, in FIG. 2 a possible configuration of a third flow orifice 14 of the baffle plate 12 is visible which, as already described in the foregoing, may be in the form of an elongate rectangular orifice or of a corresponding slot-shaped orifice.

REFERENCE NUMERALS

10 Gas generator
12 baffle plate
14 third flow orifice
15 welded joint
16 flange
17 first welded joint
18 second welded joint
20 bottom portion
21 recess
22 first wall portion
24 second wall portion
30 closure bottom
32 opening
34 arch
36 first weld seam
37 second weld seam
38 weld
40 igniter
42 contact element
44 cap
46 holder
48 plug interface
50 first propellant
52 ignition chamber
54 second propellant
56 combustion chamber
58 gas guiding chamber
60 sleeve
61 first opening
62 first sleeve portion
63 second opening
64 second sleeve portion
66 third sleeve portion
68 first flow orifice
70 diffusor
72 first portion
74 second portion
76 bottom
78 second flow orifice
79 tamping
80 filter A longitudinal axis
E plane
H sleeve center axis
M center axis
S flow path
V displacing direction
Z axis of symmetry

The invention claimed is:

1. A gas generator for a vehicle safety system, comprising a sleeve positioned inside the gas generator which has first flow orifices and encloses an ignition chamber including a first propellant, wherein at an outside of the sleeve there is connected a combustion chamber filled with a second propellant, the combustion chamber being surrounded by a diffusor located inside the gas generator and having second flow orifices, and comprising a baffle plate which has third flow orifices and surrounds the diffusor, wherein the sleeve, the diffusor and the baffle plate are adhesively bonded to each other, the sleeve having a front-side first opening and an opposite second opening, the sleeve being bonded to the diffusor at the first opening, wherein, in the case of activation of the gas generator, gas formed in the ignition chamber can flow into the combustion chamber only in a radial direction through the first flow orifices of the sleeve, and gas formed in the combustion chamber can flow into a gas guiding chamber only in an axial direction through the second flow orifices of the diffusor, wherein areas of the diffusor and of the baffle plate can be displaced along with the sleeve as a structural unit in a displacing direction.

2. The gas generator according to claim 1, wherein the sleeve, the diffusor and the baffle plate are connected by one single welded joint or by plural welded joints, the welded joints being configured as radially circumferential welded joints.

3. The gas generator according to claim 1, wherein a plane radially extending through the first flow orifices, equally extends through the third flow orifices, and the second flow orifices are arranged to be spaced apart from the plane.

4. The gas generator according to claim 1, wherein the sleeve has a substantially radially extending first sleeve portion which is adhesively bonded to an inside of a bottom of the diffusor and which is transformed into a conical second sleeve portion tapering toward the sleeve center axis (H) to which a third sleeve portion extending substantially in parallel to the sleeve center axis (H) and including the first flow orifices is connected.

5. The gas generator according to claim 1, wherein the baffle plate is pot-shaped and has a cylindrical first wall portion to which a conical radially inwardly narrowing second wall portion is connected which is transformed into a bottom portion substantially perpendicularly to a longitudinal axis (A) of the gas generator, wherein the baffle plate includes a recess in the bottom portion and/or the third flow orifices as slot-shaped substantially rectangular orifices.

6. The gas generator according to claim 1, wherein the diffusor is pot-shaped and has a cylindrical first portion to which a conical radially inwardly narrowing second portion is connected which is transformed into a bottom of the diffusor substantially perpendicularly to a longitudinal axis (A) of the gas generator.

7. The gas generator according to claim 1, wherein the baffle plate and the diffusor enclose a pot-shaped gas guiding chamber and/or extend substantially in parallel to each other over an entire area of a gas guiding chamber, with the exception of a recess of the baffle plate.

8. An airbag module comprising a gas generator, an airbag inflatable by said gas generator and a fastener for arranging the airbag module on a vehicle, wherein the gas generator is configured according to claim 1.

9. A vehicle safety system for protection of a person, comprising a gas generator, an airbag inflatable by the gas generator as part of an airbag module, and an electronic control unit by means of which the gas generator can be activated when a trigger situation is given, wherein the gas generator is configured according to claim 1.

10. The gas generator according to claim 1, further comprising a closure bottom bonded to the baffle plate, the closure bottom comprising an ignitor holder receiving opening, wherein the closure bottom and the baffle plate define a closed housing for the gas generator in which the only openings in the housing are the ignitor holder receiving opening and the third flow orifices in the baffle plate.

11. The gas generator according to claim 1, wherein the baffle plate is closed by a closure bottom, the baffle plate and the closure bottom forming an area of an outer housing of the gas generator, and the closure bottom together with the diffusor and the sleeve enclose the combustion chamber such that the combustion chamber is configured as a toroidal chamber which, when viewed in a longitudinal section, has sidewalls substantially aligned in parallel to each other and facing the closure bottom, the sidewalls being transformed, in a direction facing away from the closure bottom, into sidewalls converging relative to each other.

12. The gas generator according to claim 11, wherein the baffle plate is connected to the closure bottom and the diffusor by means of one single weld.

13. The gas generator according to claim 1, wherein the sleeve is in the form of a hollow component having a generally cylindrical and/or frusto-conical configuration, wherein the first opening is closed by the diffusor.

14. The gas generator according to claim 13, further comprising a tamping positioned between the diffusor and the sleeve.

15. The gas generator according to claim 13, wherein the sleeve is closed at the second opening by a holder which receives an igniter and is supported on the holder to be displaceable in a displacing direction.

16. The gas generator according to claim 15, wherein the sleeve is fitted over the holder in sliding engagement therewith so that the holder is configured to constrain radial movement of the sleeve relative to a center axis (H) of the gas generator and so that the sleeve is configured to be displaceable axially parallel to the center axis (H) relative to the holder.

17. A gas generator for a vehicle safety system, comprising a sleeve positioned inside the gas generator which has first flow orifices and encloses an ignition chamber including a first propellant, wherein at an outside of the sleeve there is connected a combustion chamber filled with a second propellant, the combustion chamber being surrounded by a diffusor located inside the gas generator and having second flow orifices, and comprising a baffle plate which has third flow orifices and surrounds the diffusor, wherein the sleeve, the diffusor and the baffle plate are adhesively bonded to each other, the sleeve having a front-side first opening and an opposite second opening, the sleeve being bonded to the diffusor at the first opening;

wherein the sleeve is in the form of a hollow component having a generally cylindrical and/or frusto-conical configuration, wherein the first opening is closed by the diffusor, wherein the sleeve is closed at the second opening by a holder which receives an igniter and is supported on the holder to be displaceable in a displacing direction; and wherein the sleeve is fitted over the holder in sliding engagement therewith so that the holder is configured to constrain radial movement of the sleeve relative to a center axis (H) of the gas generator and so that the sleeve is configured to be displaceable axially parallel to the center axis (H) relative to the holder.

18. A gas generator for a vehicle safety system, comprising a sleeve positioned inside the gas generator which has first flow orifices and encloses an ignition chamber including a first propellant, wherein at an outside of the sleeve there is connected a combustion chamber filled with a second propellant, the combustion chamber being surrounded by a diffusor located inside the gas generator and having second flow orifices, and comprising a baffle plate which has third flow orifices and surrounds the diffusor, wherein the sleeve, the diffusor and the baffle plate are adhesively bonded to each other, the sleeve having a front-side first opening and an opposite second opening, the sleeve being bonded to the diffusor at the first opening, wherein the sleeve is in the form of a hollow component having a generally cylindrical and/or frusto-conical configuration, wherein the first opening is closed by the diffusor, and wherein the gas generator further comprises a tamping positioned between the diffusor and the sleeve.

* * * * *